United States Patent
Heo et al.

(10) Patent No.: US 9,796,841 B2
(45) Date of Patent: Oct. 24, 2017

(54) AROMATIC VINYL-BASED COPOLYMER AND THERMOPLASTIC RESIN COMPOSITION INCLUDING THE SAME

(71) Applicant: Samsung SDI Co., Ltd., Yongin-si (KR)

(72) Inventors: Jae Won Heo, Uiwang-si (KR); Joo Hyun Jang, Uiwang-si (KR); Kwang Soo Park, Uiwang-si (KR); Bo Eun Kim, Uiwang-si (KR); Yu Jin Jung, Uiwang-si (KR); Ki Bo Chang, Uiwang-si (KR); Young Sub Jin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 3 days.

(21) Appl. No.: 14/872,246

(22) Filed: Oct. 1, 2015

(65) Prior Publication Data

US 2016/0096954 A1    Apr. 7, 2016

(30) Foreign Application Priority Data

Oct. 2, 2014  (KR) .................. 10-2014-0133365

(51) Int. Cl.
| | | |
|---|---|---|
| *C08L 25/12* | (2006.01) | |
| *C08F 212/10* | (2006.01) | |
| *C08F 230/08* | (2006.01) | |
| *C08J 5/00* | (2006.01) | |

(52) U.S. Cl.
CPC ............ *C08L 25/12* (2013.01); *C08F 212/10* (2013.01); *C08J 5/00* (2013.01); *C08J 2325/12* (2013.01); *C08J 2425/14* (2013.01); *C08J 2451/04* (2013.01); *C08L 2205/025* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 7,683,131 B2 | 3/2010 | Goldacker et al. | |
| 2009/0035246 A1* | 2/2009 | Do ..................... | A61K 8/895 424/70.7 |
| 2012/0016068 A1* | 1/2012 | Chung ................ | C08L 25/12 524/504 |
| 2014/0187717 A1* | 7/2014 | Kwon .................. | C08L 69/00 525/67 |
| 2015/0203647 A1* | 7/2015 | Zhu ..................... | B29C 44/348 521/88 |
| 2016/0137884 A1* | 5/2016 | Yamamoto .......... | C09J 133/08 428/335 |

FOREIGN PATENT DOCUMENTS

| | | |
|---|---|---|
| KR | 10-2006-0119994 A | 11/2006 |
| KR | 10-2012-0006839 A | 1/2012 |
| KR | 10-2014-0092485 A | 7/2014 |

* cited by examiner

*Primary Examiner* — Jeffrey Mullis
(74) *Attorney, Agent, or Firm* — Additon, Higgins & Pendleton, P.A.

(57) ABSTRACT

An aromatic vinyl copolymer is a polymer of a reaction mixture including: an aromatic vinyl compound; a vinyl cyanide compound; a silicone compound having at least two unsaturated reactive groups; and a $C_4$ to $C_{20}$ linear or branched alkyl group-containing acrylic compound. A thermoplastic resin composition including the aromatic vinyl copolymer can have excellent matting properties, impact resistance, flowability, and balance therebetween.

15 Claims, 1 Drawing Sheet

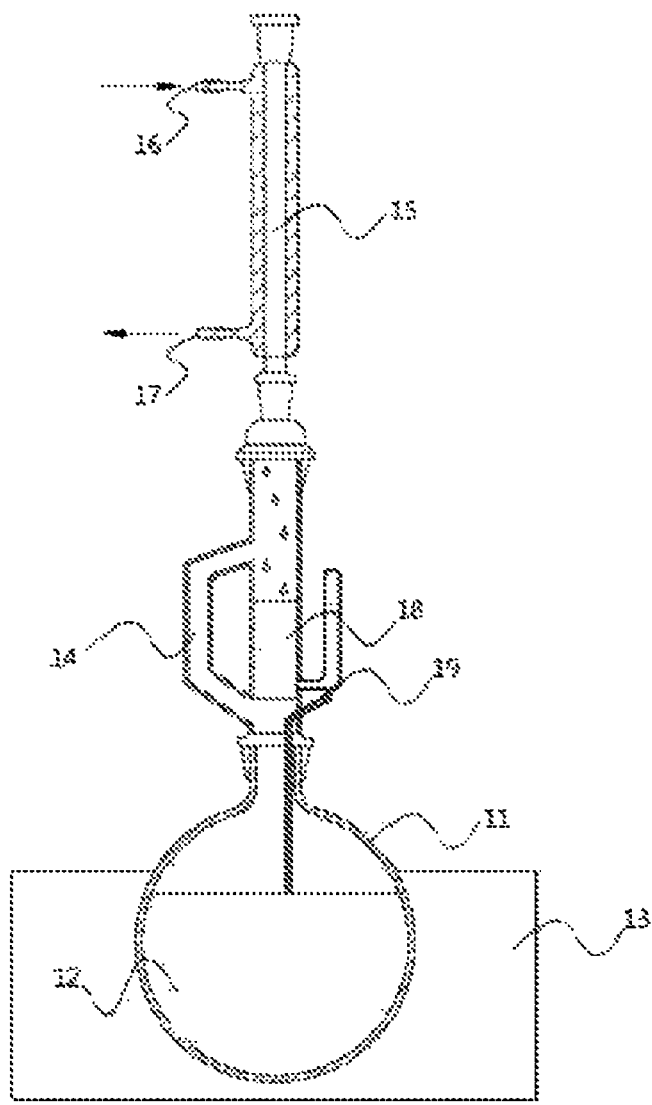

AROMATIC VINYL-BASED COPOLYMER AND THERMOPLASTIC RESIN COMPOSITION INCLUDING THE SAME

CROSS-REFERENCE TO RELATED APPLICATION

This application claims priority under 35 USC Section 119 to and the benefit of Korean Patent Application 10-2014-0133365, filed Oct. 2, 2014, the entire disclosure of which is incorporated herein by reference.

FIELD

The present invention relates to an aromatic vinyl copolymer, a thermoplastic resin composition including the same, and a molded article formed of the thermoplastic resin composition.

BACKGROUND

Thermoplastic resins exhibit excellent physical properties, such as low specific gravity, good moldability, and good impact resistance, as compared with glass or metal, and are useful for housings of electrical/electronic products, automotive interior/exterior materials, and exterior materials for construction. Particularly, with the trend of producing larger and lighter weight electrical/electronic products, plastic products made of thermoplastic resins are quickly replacing existing glass or metal-based products.

Moreover, for environmental friendliness and process cost reduction, there is an increasing need for non-painted materials which can exhibit appearance and surface properties such as color and gloss without additional processes. In particular, for applications such as interior/exterior materials of automobiles and electronics, exterior materials for buildings, and the like, there is a need for development of low-gloss products which satisfy consumer demand for a luxurious appearance.

To reduce surface gloss of a molded article (interior/exterior materials and the like) formed of a thermoplastic resin composition without a post-painting process, increasing the size of rubber in the resin composition to several micrometers or more, or incorporating highly crosslinked matting agents and/or inorganic matting agents such as talc into the resin composition, may be employed.

However, conventional thermoplastic resin compositions including highly crosslinked matting agents can exhibit low flowability (injection moldability) and thus have limitations for use in injection-molded articles, although the resin compositions can be used for extrusion-molded articles having low gloss characteristics.

Therefore, there is a need for a thermoplastic resin composition which exhibits excellent flowability with minimal or no deterioration in matting properties, impact resistance, and the like and is thus can be applicable for injection-molded articles and the like.

SUMMARY OF THE INVENTION

Embodiments provide an aromatic vinyl copolymer which can have excellent matting properties, impact resistance and flowability, a thermoplastic resin composition which includes the aromatic vinyl copolymer and thus can exhibit excellent matting properties, impact resistance, flowability, and balance therebetween, and a molded article formed of the same.

The aromatic vinyl copolymer is a polymer of a reaction mixture which includes: an aromatic vinyl compound; a vinyl cyanide compound; a silicone compound having at least two unsaturated reactive groups; and a $C_4$ to $C_{20}$ linear or branched alkyl group-containing acrylic compound.

In exemplary embodiments, the reaction mixture may include about 0.1 parts by weight to about 20 parts by weight of the silicone compound and about 1 part by weight to about 20 parts by weight of the acrylic compound, each based on about 100 parts by weight of a monomer mixture including about 60 wt % to about 80 wt % of the aromatic vinyl compound and about 20 wt % to about 40 wt % of the vinyl cyanide compound.

In exemplary embodiments, the silicone compound may include at least one of a first silicone compound having a weight average molecular weight of about 150 g/mol to less than about 6,000 g/mol as represented by Formula 1 and a second silicone compound having a weight average molecular weight of about 6,000 g/mol to about 100,000 g/mol as represented by Formula 2:

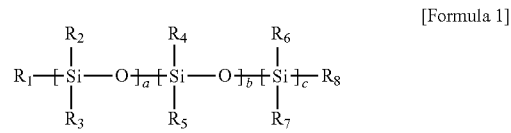

[Formula 1]

wherein a, b and c are the same or different and are each independently an integer of 0 to 79 (provided that a, b and c are not simultaneously 0, and a+b+c ranges from 1 to 79); $R_1$ to $R_8$ are the same or different and are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_1$ to $R_8$ include polymerizable unsaturated reactive groups; and the compound may have a linear structure or a cyclic structure in which $R_1$ and $R_8$ are connected to each other or form a single bond;

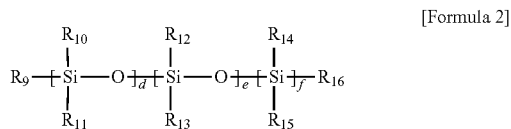

[Formula 2]

wherein d, e and f are the same or different and are each independently an integer of 0 to 1,500 (provided that d, e and f are not 0 at the same time, and d+e+f ranges from 80 to 1,500); $R_9$ to $R_{16}$ are the same or different and are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_9$ to $R_{16}$ include polymerizable unsaturated reactive groups.

In exemplary embodiments, the first silicone compound may include a compound represented by Formula 3:

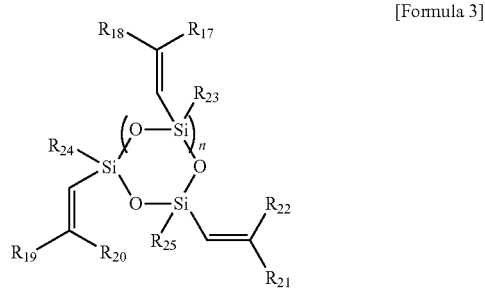

[Formula 3]

wherein $R_{17}$ to $R_{22}$ are the same or different and are each independently a hydrogen atom, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{23}$ to $R_{25}$ are the same or different and are each independently a hydrogen atom or a substituted or unsubstituted $C_1$ to $C_6$ alkyl group; and n is an integer of 1 to 6.

In exemplary embodiments, the first silicone compound may have a weight average molecular weight of about 150 g/mol to about 3,000 g/mol, and the second silicone compound may have a weight average molecular weight of about 6,500 g/mol to about 30,000 g/mol.

In exemplary embodiments, a difference in weight average molecular weight between the first silicone compound and the second silicone compound may range from about 5,000 g/mol to about 20,000 g/mol.

In exemplary embodiments, the aromatic vinyl copolymer may include about 5 wt % to about 100 wt % of insolubles remaining therein after Soxhlet extraction for 48 hours using tetrahydrofuran (THF), and about 0.03 wt % to about 3.26 wt % of silicon measured by X-ray fluorescence (XRF) analysis, based on the total weight of the copolymer.

In exemplary embodiments, the aromatic vinyl copolymer may have a glass transition temperature of about 90° C. to about 120° C.

Another embodiment relates to a thermoplastic resin composition. The thermoplastic resin composition includes the aromatic vinyl copolymer as set forth above.

In exemplary embodiments, the aromatic vinyl copolymer may be present in an amount of about 1 wt % to about 50 wt % based on the total weight (100 wt %) of the thermoplastic resin composition.

In exemplary embodiments, the thermoplastic resin composition may include at least one of a rubber-modified aromatic vinyl copolymer, a polycarbonate resin, and a poly(meth)acrylate resin.

In exemplary embodiments, the thermoplastic resin composition may have a gloss of about 20% to about 60% as measured at an angle of about 60° in accordance with ASTM D523; an Izod impact strength of about 5 kgf·cm/cm to about 15 kgf·cm/cm as measured on an about ⅛" thick specimen in accordance with ASTM D256; and a melt index (MI) of about 5.5 g/10 min to about 20 g/10 min as measured under conditions of about 220° C./10 kg in accordance with ISO 1133.

Another embodiment relates to a molded article formed of the thermoplastic resin composition as set forth above.

BRIEF DESCRIPTION OF THE DRAWINGS

FIG. 1 shows a Soxhlet extractor according to one embodiment of the present invention.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with exemplary embodiments, an aromatic vinyl copolymer is a polymer of a reaction mixture which includes: (A) an aromatic vinyl compound, (B) a vinyl cyanide compound, (C) a silicone compound having at least two unsaturated reactive groups, and (D) a $C_4$ to $C_{20}$ linear or branched alkyl group-containing acrylic compound.

(A) Aromatic Vinyl Compound

Examples of the aromatic vinyl compound may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures thereof. In exemplary embodiments, the aromatic vinyl compound may include styrene, α-methylstyrene, and/or a mixture thereof.

In exemplary embodiments, the aromatic vinyl compound may be present in an amount of about 60 wt % to about 80 wt %, for example, about 65 wt % to about 75 wt %, based on the total weight (100 wt %) of a monomer mixture ((A)+(B)) including the aromatic vinyl compound (A) and the vinyl cyanide compound (B). In some embodiments, the monomer mixture may include the aromatic vinyl compound in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the aromatic vinyl compound can be in a range from about any of the foregoing amounts to about any other of the foregoing amounts.

Within this range, a thermoplastic resin composition including the aromatic vinyl copolymer can have excellent impact strength and heat resistance.

(B) Vinyl Cyanide Compound

Examples of the vinyl cyanide compound may include without limitation acrylonitrile, methacrylonitrile, ethacrylonitrile, phenylacrylonitrile, α-chloroacrylonitrile, fumaronitrile, and the like, and mixtures thereof. In exemplary embodiments, the vinyl cyanide compound may include acrylonitrile, methacrylonitrile, or the like.

In exemplary embodiments, the vinyl cyanide compound may be present in an amount of about 20 wt % to about 40 wt %, for example, about 25 wt % to about 35 wt % based on the total weight (100 wt %) of a monomer mixture ((A)+(B)) including the aromatic vinyl compound (A) and the vinyl cyanide compound (B). In some embodiments, the monomer mixture may include the vinyl cyanide compound in an amount of about 20, 21, 22, 23, 24, 25, 26, 27, 28, 29, 30, 31, 32, 33, 34, 35, 36, 37, 38, 39, or 40 wt %. Further, according to some embodiments, the amount of the vinyl cyanide compound can be in a range from about any of the foregoing amounts to about any other of the foregoing amounts.

Within this range, a thermoplastic resin composition including the aromatic vinyl copolymer can have excellent mechanical properties, moldability, and matting properties.

(C) Silicone Compound

The silicone compound has at least two unsaturated reactive groups, and may include, for example, at least one of (C1) a first silicone compound having a weight average molecular weight of about 150 g/mol to less than about 6,000 g/mol and having at least two unsaturated reactive groups and (C2) a second silicone compound having a weight average molecular weight of about 6,000 g/mol to about 100,000 g/mol and having at least two unsaturated reactive groups.

(C1) First Silicone Compound

The first silicone compound is provided to realize excellent impact resistance and matting properties, has a weight average molecular weight of about 150 g/mol to less than about 6,000 g/mol as measured by gel permeation chromatography (GPC), and includes at least two unsaturated reactive groups.

In exemplary embodiments, the first silicone compound may be a compound represented by Formula 1.

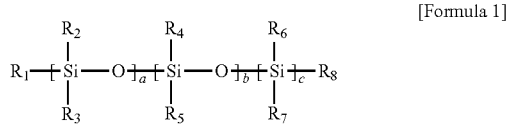

[Formula 1]

wherein a, b and c are the same or different and are each independently an integer of 0 to 79 (provided that a, b and c are not 0 at the same time, and a+b+c ranges from 1 to 79); $R_1$ to $R_8$ are the same or different and are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_1$ to $R_8$ include polymerizable unsaturated reactive groups.

The compound can have a linear or cyclic structure. For example, when $R_1$ and $R_8$ are linked to one another or form a single bond, the compound may have a cyclic structure represented by Formula 1a.

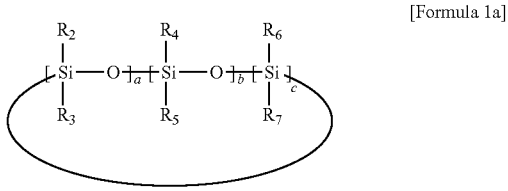

[Formula 1a]

wherein a, b, c, and $R_2$ to $R_7$ are the same as defined in Formula 1.

As used herein, unless otherwise stated, the term "substituted" means that a hydrogen atom is substituted with a substituent including a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a hydroxyl group, a $C_1$ to $C_{20}$ alkoxy group, a (meth)acrylate group, an amino group, an epoxy group, a carboxyl group, an ester group, an isocyanate group, a mercapto group, and/or a combination thereof. As used herein, unless otherwise stated, the term "hetero" refers to at least one heteroatom such as N, O, S and/or P in a chemical formula.

In addition, the term "(meth)acryl" refers to "acryl" and/or "methacryl." For example, the term "(meth)acrylates" refers to "acrylates" and/or "methacrylates."

In exemplary embodiments, the compound represented by Formula 1 may include a compound (cyclic structure) represented by Formula 3.

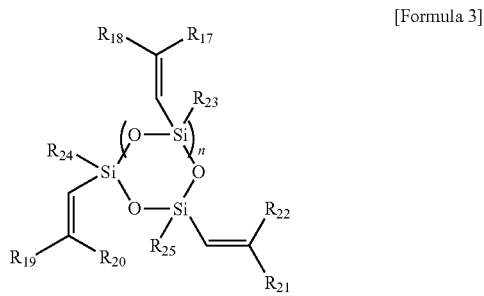

[Formula 3]

wherein $R_{17}$ to $R_{22}$ are the same or different and are each independently a hydrogen atom, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{23}$ to $R_{25}$ are the same or different and are each independently a hydrogen atom or a substituted or unsubstituted $C_1$ to $C_6$ alkyl group; and n is an integer of 1 to 6.

Examples of the first silicone compound may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra-sec-butyl-1,3,5,7-tetravinyl-cyclotetrasiloxane, 1,3,5,7,9-pentasec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-pentaisopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaisopropyl-cyclopentasiloxane, 1,3,5-tri-sec-butyl-1,3,5-trimethyl-cyclotrisiloxane, 1,3,5,7-tetra-sec-butyl-1,3,5,7-tetramethyl-cyclotetrasiloxane, 1,3,5,7,9-penta-sec-butyl-1,3,5,7,9-pentamethyl-cyclopentasiloxane, 1,3,5-tri-sec-butyl-1,3,5-triethyl-cyclotrisiloxane, 1,3,5,7-tetra-sec-butyl-1,3,5,7-tetraethyl-cyclotetrasiloxane, 1,3,5,7,9-penta-sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri-sec-butyl-cyclotrisiloxane, 1,3,5,7-tetra-sec-butyl-cyclotetrasiloxane, 1,3,5,7,9-penta-sec-butyl-cyclopentasiloxane, 1,3,5-trimethyl-1,3,5-trivinyl-cyclotrisiloxane, 1,3,5,7-tetramethyl-1,3,5,7-tetravinylcyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof.

The first silicone compound may be obtained by mixing divinylsilane, trivinylsilane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, and/or divinyldiphenylchlorosilane, without being limited thereto.

In exemplary embodiments, the first silicone compound can include 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and/or a mixture thereof. For example, the first silicone compound can include 1,3,5,7-tetramethyl-1,3,5,7-tetravinyl-cyclotetrasiloxane.

In exemplary embodiments, the first silicone compound may have a weight average molecular weight of about 150 g/mol to less than about 6,000 g/mol, for example, about 150 g/mol to about 3,000 g/mol, and as another example about 150 g/mol to about 1,000 g/mol. Within this range, the silicone compound can allow easy control over the degree of crosslinking of the copolymer and smooth crosslinking, and thereby can provide excellent matting properties.

(C2) Second Silicone Compound

The second silicone compound is used to provide excellent impact resistance and matting properties, has a weight average molecular weight of about 6,000 g/mol to about 100,000 g/mol as measured by gel permeation chromatography (GPC), and include at least two unsaturated reactive groups.

In exemplary embodiments, the second silicone compound may be represented by Formula 2.

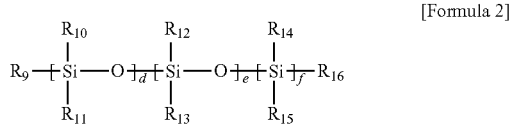

[Formula 2]

wherein d, e and f are the same or different and are each independently an integer of 0 to 1,500 (provided that d, e and f are not 0 at the same time, and d+e+f ranges from 80 to 1,500); $R_9$ to $R_{16}$ are the same or different and are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_9$ to $R_{16}$ include polymerizable unsaturated reactive groups.

In exemplary embodiments, examples of the compound represented by Formula 2 may include a compound represented by Formula 2a, without being limited thereto.

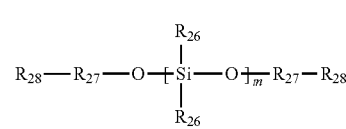

[Formula 2a]

wherein each $R_{26}$ is independently a hydrogen atom or a $C_1$ to $C_{10}$ alkyl group; each $R_{27}$ is independently a single bond or a $C_1$ to $C_{10}$ alkenyl group; each $R_{28}$ is independently a vinyl group, a (meth)acrylate group, or an epoxy group; and m is an integer from 80 to 1,500.

For example, the second silicone compound may be methacrylated polydimethylsiloxane (MPDMS, $R_{26}$: methyl group, $R_{27}$: propylene group, $R_{28}$: (meth)acrylate group) having a weight average molecular weight of about 6,000 g/mol to about 100,000 g/mol, without being limited thereto.

In exemplary embodiments, the second silicone compound may have a weight average molecular weight of about 6,000 g/mol to about 100,000 g/mol, for example, about 6,500 g/mol to about 30,000 g/mol, and as another example about 7,000 g/mol to about 20,000 g/mol. Within this range, the silicone compound can allow easy control over the degree of crosslinking of the copolymer and smooth crosslinking, and can thereby provide excellent matting properties.

In addition, a difference in weight average molecular weight between the first silicone compound and the second silicone compound may range from about 5,000 g/mol to about 20,000 g/mol, for example, from about 5,400 g/mol to about 19,850 g/mol, and as another example from about 8,000 g/mol to about 12,000 g/mol. Within this range, a thermoplastic resin composition including the aromatic vinyl copolymer can have excellent impact resistance and matting properties.

In exemplary embodiments, the silicone compound (C) may be present in an amount of about 0.1 parts by weight to about 20 parts by weight, for example, about 1 part by weight to about 15 parts by weight, based on about 100 parts by weight of the monomer mixture ((A)+(B)) including the aromatic vinyl compound (A) and the vinyl cyanide compound (B). In some embodiments, the monomer mixture may include the silicone compound (C) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the silicone compound (C) can be in a range from about any of the foregoing amounts to about any other of the foregoing amounts.

Within this range, the silicone compound can allow easy control over the degree of crosslinking of the copolymer, and can provide uniform and excellent matting properties to the copolymer with minimal or no deterioration in impact resistance, heat resistance, and the like.

In addition, when the silicone compound (C) is a mixture of the first silicone compound (C1) and the second silicone compound (C2), a weight ratio of the first silicone compound to the second silicone compound (C1:C2) may range from about 1:0.1 to about 1:3, for example, about 1:0.25 to about 1:1.5. Within this range, the silicone compound can allow easy control over the degree of crosslinking of the copolymer, and can provide excellent impact resistance and matting properties to the copolymer.

(D) Acrylic Compound

The acrylic compound serves to lower glass transition temperature of the aromatic vinyl copolymer and/or to enhance flowability (injection moldability) of a thermoplastic resin composition including the copolymer. The acrylic compound may be a $C_4$ to $C_{20}$ linear or branched alkyl group-containing acrylic compound, for example, an acrylic compound represented by Formula 4.

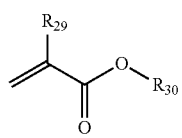

[Formula 4]

where $R_{29}$ is a hydrogen atom, a methyl group, or an ethyl group, and $R_{30}$ is a $C_4$ to $C_{20}$ linear or branched alkyl group.

Examples of the acrylic compound may include without limitation butyl acrylate, butyl methacrylate, butyl ethacrylate, 2-ethylhexyl acrylate, 2-ethylhexyl methacrylate, lauryl acrylate, lauryl methacrylate, and the like, and mixtures thereof.

In exemplary embodiments, the acrylic compound may be present in an amount of about 1 part by weight to about 20 parts by weight, for example, about 5 parts by weight to about 15 parts by weight, based on about 100 parts by weight of the monomer mixture ((A)+(B)) including the aromatic vinyl compound (A) and the vinyl cyanide compound (B). In some embodiments, the monomer mixture may include the acrylic compound in an amount of about 1, 2, 3, 4, 5, 6, 7, 8, 9, 10, 11, 12, 13, 14, 15, 16, 17, 18, 19, or 20 parts by weight. Further, according to some embodiments, the amount of the acrylic compound can be in a range from about any of the foregoing amounts to about any other of the foregoing amounts.

Within this range, a thermoplastic resin composition including the aromatic vinyl copolymer can have excellent mechanical properties, moldability (flowability), and matting properties.

In the aromatic vinyl copolymer according to the present invention, the reaction mixture may further include a polyfunctional vinyl compound including at least one of divinylbenzene, ethylene glycol di(meth)acrylate, allyl (meth)acrylate, diallyl phthalate, diallyl malate, and/or triallyl isocyanurate to control degree of crosslinking and polymerization rate of the copolymer.

In exemplary embodiments, the polyfunctional vinyl compound may be present in an amount of about 0.001 parts by weight to about 10 parts by weight, for example, about 0.01 parts by weight to about 3 parts by weight, based on about 100 parts by weight of the monomer mixture ((A)+(B)) including the aromatic vinyl compound (A) and the vinyl cyanide compound (B). Within this range, it can be possible to easily control the degree of crosslinking and polymerization rate of the copolymer and to provide excellent matting properties with minimal or no deterioration in impact resistance and heat resistance.

According to the present invention, the aromatic vinyl copolymer may be prepared by a typical polymerization method such as suspension polymerization, emulsion polymerization, and solution polymerization, without being limited thereto. For example, the aromatic vinyl copolymer may be prepared by suspension polymerization. In exemplary embodiments, a polymerization initiator and a chain transfer agent may be added to the reaction mixture including the components in the amounts as set forth above to prepare a reaction mixture solution, followed by suspension polymerization by introducing the reaction mixture solution into an aqueous solution in which a suspension stabilizer and the like are dissolved, thereby preparing the aromatic vinyl copolymer. As used here, polymerization temperature and polymerization time can be suitably adjusted. For example, polymerization may be performed at a polymerization temperature of about 65° C. to about 125° C., for example about 70° C. to about 120° C., for about 1 to about 8 hours.

The polymerization initiator may include typical radical polymerization initiators known in the art. For example, the polymerization initiator may include octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, and/or azobis-(2,4-dimethyl)-valeronitrile, without being limited thereto. These polymerization initiators may be used alone or in combination thereof. The polymerization initiator may be present in an amount of about 0.01 parts by weight to about 10 parts by weight, for example, about 0.03 parts by weight to about 5 parts by weight, based on about 100 parts by weight of the reaction mixture, without being limited thereto.

The chain-transfer agent may be used to control weight average molecular weight of the copolymer and enhance thermal stability of the copolymer. The chain transfer agent may include typical chain transfer agents known in the art. Examples of the chain-transfer agent may include: alkyl mercaptan in the form of $CH_3(CH_2)_nSH$ (where n is an integer of 1 to 20) including n-butyl mercaptan, n-octyl mercaptan, n-dodecyl mercaptan, t-dodecyl mercaptan, isopropyl mercaptan, and n-amyl mercaptan; halogenated compounds including carbon tetrachloride; and aromatic compounds including α-methylstyrene dimers and α-ethylstyrene dimers, without being limited thereto. These may be used alone or in combination thereof. The chain-transfer agent may be present in an amount of about 0.01 parts by weight to about 10 parts by weight, for example, about 0.02 parts by weight to about 5 parts by weight, based on about 100 parts by weight of the reaction mixture. Within this range, the copolymer can have heat stability and appropriate molecular weight.

The aromatic vinyl copolymer may be polymerized by introducing the mixed liquid into an aqueous solution including at least one or more additives, such as suspension stabilizers, suspension stabilization aids, and/or antioxidants. The additives may be present in an amount of about 0.001 parts by weight to about 20 parts by weight based on about 100 parts by weight of the reaction mixture, without being limited thereto.

Examples of the suspension stabilizer may include: organic suspension stabilizers including homopolymers and/or copolymers of acrylic acid and/or methacrylic acid, polyalkyl acrylate-acrylic acid, polyolefin-maleic acid, polyvinyl alcohol, and cellulose; inorganic suspension stabilizers including tricalcium phosphate; and the like, and mixtures thereof, without being limited thereto. As used here, the acrylic acid or methacrylic acid may be in the form of a salt of sodium, potassium, or ammonium to ensure appropriate solubility.

Examples of the suspension stabilization aids may include disodium hydrogen phosphate, sodium dihydrogen phosphate and the like, and may also include sodium sulfate in order to control solubility of a water-soluble polymer or monomer, without being limited thereto. These may be used alone or in combination thereof.

Examples of the antioxidant may include octadecyl 3-(3, 5-di-tert-butyl-4-hydroxyphenyl)propionate, triethylene glycol-bis-3(3-tert-butyl-4-hydroxy-5-methylphenyl)propionate, 2,6-di-tert-butyl-4-methyl phenol, 2,2'-methylenebis (4-methyl-6-tert-butylphenol), tri(2,4-di-tert-butylphenyl) phosphite, n-octadecyl-3(3,5-di-tert-butyl-4-hydroxyphenyl)propionate, 1,3,5-tris(3,5-di-tert-butyl-4-hydroxybenzyl)isocyanurate, tetrakis (3-(3,5-di-tert-butyl-4-hydroxyphenyl)propionate), distearyl thiodipropionate, dilauryl thiodipropionate, di-phenyl-isooctyl phosphite, and the like, without being limited thereto. These may be used alone or in combination thereof.

After completion of polymerization, the aromatic vinyl copolymer may be obtained in particle form through cooling, cleaning, dehydration, drying and the like.

The aromatic vinyl copolymer may be a branched and/or cross-linked copolymer. As used herein, the degree of cross-linking of the copolymer may be identified based on the amount of insolubles as measured by Soxhlet extraction. In Soxhlet extraction, an organic solvent selected from the group consisting of toluene, tetrahydrofuran, ethyl acetate, chloroform, and mixtures thereof may be used, without being limited thereto. In exemplary embodiments, tetrahydrofuran (THF) can be used as a solvent.

FIG. 1 shows a Soxhlet extractor according to one embodiment of the present invention. Specifically, when a solvent 12 such as tetrahydrofuran contained in a container 11 of the reactor is vaporized using a heater 13 and the vaporized solvent flows into a condenser 15 (which includes a cooling water inlet 16 and a cooling water outlet 17) through a vaporization line 14, the solvent is liquefied again in the condenser 15 and stored in a storage member which is included in a cylindrical filter 18 and contains the copolymer (solid). Then, when the amount of stored solvent is sufficiently increased to allow the solvent to be discharged from the storage member, the solvent flows into the container 11 through a circulation line 19 together with solubles of the copolymer extracted into the solvent. This process is repeated, whereby the solubles of the copolymer are contained in the container 11 and insolubles of the copolymer remain in the storage member of the cylindrical filter 18. A weight of the insolubles is measured to determine the amount of the insolubles in the copolymer.

In exemplary embodiments, the aromatic vinyl copolymer may include about 5 wt % to about 100 wt %, for example, about 10 wt % to about 60 wt % of insolubles remaining after Soxhlet extraction for about 48 hours using tetrahydrofuran (THF) based on the total weight of the aromatic vinyl copolymer. Within this range, the copolymer can HI provide excellent impact resistance and matting properties.

In exemplary embodiments, the branched aromatic vinyl copolymer may contain about 0.03 wt % to about 3.26 wt %, for example, about 0.5 wt % to about 2.5 wt % of silicon, as measured by X-ray Fluorescence (XRF) Analysis. Within this range, the copolymer can provide excellent impact resistance and matting properties.

As used herein, XRF analysis is fluorescent X-ray spectroscopy which analyzes wavelength distribution of X-rays secondarily emitted from a material that has been excited by bombarding with X-rays, thereby estimating the kinds or composition ratio of elements in the material. XRF analysis may be performed using a typical instrument. In the present invention, an X-ray fluorescence spectrometer (Model: Axios Advanced, Manufacturer: PANalytical) is used. XRF analysis on silicon may be performed, for example, by a process in which a standard specimen for analysis is prepared, followed by measurement of elemental silicon (Si) included in the standard specimen by X-ray fluorescence (XRF) analysis and plotting a calibration curve based thereon, and then a specimen of the copolymer according to the invention is prepared, followed by measuring elemental silicon (Si) included in the specimen by X-ray fluorescence (XRF) analysis and substituting the measured values to the calibration curve, thereby performing quantitative analysis.

In exemplary embodiments, the aromatic vinyl copolymer may have a glass transition temperature of about 90° C. to about 120° C., for example, about 90° C. to about 110° C. Within this range, a thermoplastic resin composition including the aromatic vinyl copolymer can have excellent injection moldability.

In accordance with another embodiment, a thermoplastic resin composition includes the aromatic vinyl copolymer capable of exhibiting excellent impact resistance and matting properties as set forth above.

In exemplary embodiments, the thermoplastic resin composition may include the aromatic vinyl copolymer in an amount of about 1 wt % to about 50 wt %, for example, about 5 wt % to about 30 wt %, and as another example about 10 wt % to about 25 wt %, based on the total weight (100 wt %) of the thermoplastic resin composition. In some embodiments, the thermoplastic resin composition may include the aromatic vinyl copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the aromatic vinyl copolymer can be in a range from about any of the foregoing amounts to about any other of the foregoing amounts.

Within this range, the thermoplastic resin composition can have excellent impact resistance and matting properties.

In addition to the aromatic vinyl copolymer, the thermoplastic resin composition according to one embodiment of the invention may further include one or more of a typical thermoplastic resin, for example, a thermoplastic resin including a rubber-modified aromatic vinyl copolymer, a polycarbonate resin, a poly(meth)acrylate resin, and/or a mixture thereof.

The rubber-modified aromatic vinyl copolymer may include about 10 wt % to about 100 wt % of (a) a graft copolymer in which an aromatic vinyl monomer and a monomer copolymerizable with the aromatic vinyl monomer are grafted to a rubbery polymer; and optionally about 90 wt % or less of (b) an aromatic vinyl copolymer in which an aromatic vinyl monomer and a monomer copolymerizable with the aromatic vinyl monomer are copolymerized. That is, the rubber-modified aromatic vinyl copolymer according to the present invention may be prepared using the graft copolymer (a) alone, or may be prepared using a mixture of the graft copolymer (a) and the aromatic vinyl copolymer (b).

In exemplary embodiments, the graft copolymer (a) may be polymerized by adding an aromatic vinyl monomer, a monomer copolymerizable with the aromatic vinyl monomer, and the like, to a rubbery polymer, and the aromatic vinyl copolymer (b) may be polymerized by adding an aromatic vinyl monomer, a monomer copolymerizable with the aromatic vinyl monomer, and the like. As used herein, polymerization may be performed by any polymerization method known in the art, such as emulsion polymerization, suspension polymerization, and bulk polymerization. In bulk polymerization, the rubber-modified aromatic vinyl copolymer in which the graft copolymer (a) is dispersed in a matrix, i.e. the aromatic vinyl copolymer (b), may be prepared through single-step reaction without separately preparing the graft copolymer (a) and the aromatic vinyl copolymer (b).

In exemplary embodiments, a rubber (rubbery polymer) may be present in an amount of about 5 wt % to about 50 wt % in the final rubber-modified aromatic vinyl copolymer. In addition, the rubber may have a z-average particle size of about 0.05 μm to about 6 μm. Within this range, the thermoplastic resin composition can have excellent properties in terms of impact resistance, and the like.

Hereinafter, the graft copolymer (a) and the aromatic vinyl copolymer (b) will be described in detail.

(a) Graft Copolymer

The graft copolymer may be obtained by grafting an aromatic vinyl monomer and a monomer copolymerizable with the aromatic vinyl monomer to a rubbery polymer, and may further optionally include a monomer for imparting processability and heat resistance, as needed.

Examples of the rubbery polymer may include without limitation diene rubbers such as polybutadiene, poly(styrene-butadiene), poly(acrylonitrile-butadiene), and the like; saturated rubbers obtained by adding hydrogen to the diene rubbers, isoprene rubbers, and the like; acrylic rubbers such as poly(butyl acrylate); ethylene-propylene-diene monomer terpolymers (EPDM); and the like, and mixtures thereof. In exemplary embodiments, the rubbery polymer can include a diene rubber, for example a butadiene rubber.

The rubbery polymer may be present in an amount of about 5 wt % to about 65 wt %, for example, about 10 wt % to about 60 wt %, and as another example about 20 wt % to about 50 wt %, based on the total weight (100 wt %) of the graft copolymer (a). Within this range, the thermoplastic resin composition can have excellent impact strength and good balance between mechanical properties.

The rubbery polymer (rubbery particles) may have an average (z-average) particle size of about 0.05 μm to about 6 μm, for example, about 0.15 μm to about 4 μm, and as another example about 0.25 μm to about 3.5 μm. Within this range, the thermoplastic resin composition can have excellent impact strength and external appearance.

The aromatic vinyl monomer is an aromatic vinyl monomer capable of being grafted to the rubbery copolymer, and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures thereof, without being limited thereto. In exemplary embodiments, the aromatic vinyl monomer may include styrene.

The aromatic vinyl monomer may be present in an amount of about 15 wt % to about 94 wt %, for example, about 20 wt % to about 80 wt %, and as another example about 30 wt % to about 60 wt %, based on the total weight (100 wt %) of the graft copolymer (a). Within this range, the thermoplastic resin composition can have excellent impact strength and good balance between mechanical properties.

Examples of the monomer copolymerizable with the aromatic vinyl monomer may include without limitation vinyl cyanide compounds, such as acrylonitrile, ethacrylonitrile, methacrylonitrile, and the like. These monomers may be used alone or in combination thereof.

The monomer copolymerizable with the aromatic vinyl monomer may be present in an amount of about 1 wt % to about 50 wt %, for example, about 5 wt % to about 45 wt %, and as another example about 10 wt % to about 30 wt %, based on the total weight (100 wt %) of the graft copolymer. Within this range, the thermoplastic resin composition can have excellent impact strength and good balance between mechanical properties.

Examples of the monomer for imparting processability and heat resistance may include acrylic acid, methacrylic acid, maleic anhydride, N-substituted maleimide, and the like, and mixtures thereof, without being limited thereto. The monomer for imparting processability and heat resistance is optionally present in an amount of about 15 wt % or less, for example, about 0.1 wt % to about 10 wt %, based on the total weight (100 wt %) of the graft copolymer. Within this range, the monomer can impart processability and heat resistance to the thermoplastic resin composition with minimal or no deterioration of other properties.

(b) Aromatic Vinyl Copolymer

The aromatic vinyl copolymer may be prepared using a mixture of the monomers, excluding the rubber (rubbery polymer), of the graft copolymer (a), and the ratio of the monomers may vary depending upon compatibility. For example, the aromatic vinyl copolymer may be obtained by copolymerization of the aromatic vinyl monomer and the monomer copolymerizable with the aromatic vinyl monomer.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures thereof, without being limited thereto. In exemplary embodiments, the aromatic vinyl monomer may include styrene.

In addition, examples of the monomer copolymerizable with the aromatic vinyl monomer may include without limitation vinyl cyanide compounds, such as acrylonitrile, ethacrylonitrile, methacrylonitrile, and the like. These monomers may be used alone or in combination thereof.

The aromatic vinyl copolymer may optionally further include a monomer for imparting processability and heat resistance, as needed. Examples of the monomer for imparting processability and heat resistance may include acrylic acid, methacrylic acid, maleic anhydride, N-substituted maleimide, and the like, and mixtures thereof, without being limited thereto.

In the aromatic vinyl copolymer, the aromatic vinyl monomer may be present in an amount of about 50 wt % to about 95 wt %, for example, about 60 wt % to about 90 wt %, and as another example about 70 wt % to about 80 wt %, based on the total weight (100 wt %) of the aromatic vinyl copolymer. Within this range, the thermoplastic resin composition can have excellent impact strength and good balance between mechanical properties.

The monomer copolymerizable with the aromatic vinyl monomer may be present in an amount of about 5 wt % to about 50 wt %, for example, about 10 wt % to about 40 wt %, and as another example about 20 wt % to about 30 wt %, based on the total weight (100 wt %) of the aromatic vinyl copolymer. Within this range, the thermoplastic resin composition can have excellent impact strength and good balance between mechanical properties.

In addition, the monomer for imparting processability and heat resistance may be present in an amount of about 30 wt % or less, for example, about 0.1 wt % to about 20 wt %, based on the total weight (100 wt %) of the aromatic vinyl copolymer. Within this range, the monomer can impart processability and heat resistance to the thermoplastic resin composition with minimal or no deterioration of other properties.

The aromatic vinyl copolymer may have a weight average molecular weight of about 50,000 g/mol to about 500,000 g/mol, without being limited thereto.

For example, the rubber-modified aromatic vinyl copolymer according to the present invention may include without limitation a resin obtained from the graft copolymer (a) alone, such as a copolymer (g-ABS) obtained by grafting a styrene monomer, which is an aromatic vinyl compound, and an acrylonitrile monomer, which is a vinyl cyanide compound, to a core butadiene rubbery polymer; and/or a resin obtained from a mixture of the graft copolymer (a) and the aromatic vinyl copolymer (b), such as acrylonitrile-butadiene-styrene (ABS) copolymer resins, acrylonitrile-ethylene-propylene rubber-styrene (AES) copolymer resins, and/or acrylonitrile-acrylic rubber-styrene (AAS) copolymer resins. As used herein, in the ABS resin, g-ABS, as the graft copolymer (a), is dispersed in a styrene-acrylonitrile (SAN) copolymer resin as the aromatic vinyl copolymer (b).

Further, the rubber-modified aromatic vinyl copolymer may include at least two graft copolymers (a), the rubbery polymers (rubber particles) of which have different average (z-average) particle sizes. In this case, the thermoplastic resin composition can have further enhanced impact resistance.

In exemplary embodiments, the thermoplastic resin composition may include the rubber-modified aromatic vinyl copolymer in an amount of about 5 wt % to about 99 wt %, for example, about 15 wt % to about 95 wt %, for example, about 30 wt % to about 90 wt %, based on the total weight (100 wt %) of the thermoplastic resin composition. Within this range, the thermoplastic resin composition can exhibit both excellent impact resistance and matting properties.

The polycarbonate resin may include any typical thermoplastic polycarbonate resins without limitation. For example, the polycarbonate resin may be an aromatic polycarbonate resin prepared by reacting a carbonate precursor, such as phosgene, halogen formate, or carbonate diester with one or more diphenols (aromatic dihydroxy compounds).

Examples of the diphenols may include 4,4'-biphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof, without being limited thereto. For example, the diphenol may include 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example 2,2-bis-(4-hydroxyphenyl)-propane, which is also referred to as bisphenol A.

The polycarbonate resin may include a branched polycarbonate resin, and may also be prepared by adding about 0.05 mol % to about 2 mol % of a polyfunctional compound containing tri- or higher functional groups, for example, tri- or higher-valent phenol groups, based on the total amount of the diphenols used in polymerization. The polycarbonate resin may be used in the form of a homo-polycarbonate resin, a co-polycarbonate resin, or a blend thereof. In addition, the polycarbonate resin may be partially or completely replaced by an aromatic polyester-carbonate resin obtained by polymerization in the presence of an ester precursor, for example, a bifunctional carboxylic acid.

In exemplary embodiments, the polycarbonate resin may have a weight average molecular weight (Mw) of about 10,000 g/mol to about 200,000 g/mol, for example, about 15,000 g/mol to about 120,000 g/mol, without being limited thereto.

In exemplary embodiments, the thermoplastic resin composition may include the polycarbonate resin in an amount of about 80 wt % or less, for example, about 70 wt % or less, and as another example about 60 wt % or less, based on the total weight (100 wt %) of the thermoplastic resin composition. Within this range, the thermoplastic resin composition can have both excellent impact resistance and matting properties.

The poly(meth)acrylate resin may include any typical poly(meth)acrylate resins without limitation. For example, the poly(meth)acrylate resin may be polymethylmethacrylate (PMMA), without being limited thereto.

In exemplary embodiments, the poly(meth)acrylate resin may have a weight average molecular weight (Mw) of about 10,000 g/mol to about 200,000 g/mol, for example, about 15,000 g/mol to about 120,000 g/mol, without being limited thereto.

In exemplary embodiments, the thermoplastic resin composition may include the poly(meth)acrylate resin in an amount of about 20 wt % or less, for example, about 15 wt % or less, based on the total weight (100 wt %) of the thermoplastic resin composition. Within this range, the thermoplastic resin composition can have both excellent impact resistance and matting properties.

Examples of the thermoplastic resin that can be present in the thermoplastic resin composition may include styrene-acrylonitrile copolymer (SAN) resin, methyl methacrylate-styrene-acrylonitrile copolymer (MSAN) resin, acrylonitrile-butadiene-styrene copolymer (ABS) resin, methyl methacrylate-acrylonitrile-butadiene-styrene copolymer (MABS) resin, acrylonitrile-styrene-acrylate copolymer (ASA) resin, polycarbonate (PC)/acrylonitrile-butadiene-styrene copolymer (ABS) alloy, polycarbonate (PC)/acrylonitrile-styrene-acrylate copolymer (ASA) alloy, polymethylmethacrylate (PMMA)/acrylonitrile-butadiene-styrene copolymer (ABS) alloy, polymethylmethacrylate (PMMA)/methyl methacrylate-acrylonitrile-butadiene-styrene copolymer (MABS) alloy, polymethylmethacrylate (PMMA)/acrylonitrile-styrene-acrylate copolymer (ASA) alloy, and the like, and mixtures thereof, without being limited thereto.

The thermoplastic resin composition according to the present invention may further include one or more typical additives, as needed. Examples of the additives may include without limitation flame retardants, antioxidants, anti-dripping agents, lubricants, release agents, nucleating agents, antistatic agents, stabilizers, pigments, dyes, and the like, and mixtures thereof. When the additives are used, the additives may be present in an amount of 0.001 wt % to 10 wt % based on the total weight (100 wt %) of the thermoplastic resin composition, without being limited thereto.

The thermoplastic resin composition according to the present invention can exhibit excellent impact resistance, matting properties, and flowability, and may have a gloss of about 20% to about 60%, for example, about 20 to about 40%, as measured at an angle of 60° in accordance with ASTM D523, an Izod impact strength of about 5 kgf·cm/cm to about 15 kgf·cm/cm, for example, about 12 kgf·cm/cm to about 14.5 kgf·cm/cm, as measured on an about ⅛" thick specimen in accordance with ASTM D256, and a melt index (MI) of about 5.5 g/10 min to about 20 g/10 min, for example, about 6 g/10 min to about 15 g/10 min, as measured under conditions of about 200° C./10 kg in accordance with ISO 1133.

In accordance with another embodiment, a molded article is formed of the thermoplastic resin composition as set forth. The thermoplastic resin composition according to the present invention may be prepared by a method of preparing a thermoplastic resin composition known in the art. For example, the above components and, optionally, one or more additives can be mixed, followed by melt extrusion in an extruder, thereby preparing a resin composition in the form of pellets. The prepared pellets may be produced into various molded articles (products) through various molding methods, such as injection molding, extrusion, vacuum molding, casting, and the like. Such molding methods are well known to those skilled in the art. The thermoplastic resin composition can exhibit excellent flowability (moldability), thereby allowing easy injection molding. The molded article can be a low gloss product having luxurious appearance and may be useful for interior/exterior materials for automobiles or electric/electronic products and exterior materials for construction.

Hereinafter, the present invention will be described in more detail with reference to the following examples. It should be understood that these examples are provided for illustration only and are not to be construed in any way as limiting the present invention.

EXAMPLE

Preparative Example 1

Preparation of Aromatic Vinyl Copolymer

A reaction mixture including: a monomer mixture including 76 wt % of styrene and 24 wt % of acrylonitrile; 2.3 parts by weight of 1,3,5,7-tetramethyl-1,3,5,7-tetravinyl-cyclotetrasiloxane (weight average molecular weight: 344.7 g/mol); 1.2 parts by weight of methacrylated polydimethylsiloxane (MPDMS) having a weight average molecular weight of 9,000 g/mol; and 11.5 parts by weight of butylacrylate (BA) based on 100 parts by weight of the monomer mixture is prepared. Then, based on 100 parts by weight of the monomer mixture, 0.05 parts by weight of t-dodecyl mercaptan (TDM) as a chain-transfer agent (molecular weight regulator) and 0.2 parts by weight of azobisisobutyronitrile (AIBN) as a polymerization initiator, are added to the reaction mixture, which in turn is introduced into an aqueous solution in which a suspension stabilizer is dissolved (the aqueous solution including 0.05 parts by weight of a suspension stabilizer (tricalcium phosphate) and 140 parts by weight of deionized water). Next, suspension polymerization is performed at 70° C. for 4 hours. After completion of polymerization, dehydration and drying are performed, thereby preparing a branched aromatic vinyl copolymer.

Preparative Example 2

Preparation of Branched Aromatic Vinyl Copolymer

An aromatic vinyl copolymer is prepared in the same manner as in Preparative Example 1 except that 2-ethylhexylacrylate (2-EHA) is used instead of butylacrylate.

Preparative Example 3

Preparation of Branched Aromatic Vinyl Copolymer

An aromatic vinyl copolymer is prepared in the same manner as in Preparative Example 1 except that lauryl acrylate is used instead of butylacrylate.

Preparative Example 4

Preparation of Branched Aromatic Vinyl Copolymer

An aromatic vinyl copolymer is prepared in the same manner as in Preparative Example 1 except that butylacrylate is not used.

Property Evaluation (1) Glass transition temperature (Tg, unit: ° C.): Using a calorimeter (Q2910, TA Instruments), the prepared specimen is heated to 160° C. at a rate of 20° C./min and then slowly cooled to 50° C. to maintain equilibrium, followed by heating to 160° C. at a rate of 10° C./min. An inflection point on an obtained endothermic transition curve is determined as a glass transition temperature.

(2) Amount of insolubles in copolymer upon Soxhlet extraction (unit: mg/kg): The copolymer is subjected to Soxhlet extraction for 48 hours using tetrahydrofuran, followed by measuring an amount of insolubles remaining after extraction (mg per 1 kg of the specimen).

(3) Amount of silicon in copolymer (unit: wt %): Using a X-ray fluorescence spectrometer (Model: Axios Advanced, Manufacturer: PANalytical), a standard specimen for analysis is prepared, followed by measurement of elemental silicon (Si) included in the standard specimen by X-ray fluorescence (XRF) analysis and plotting a calibration curve based thereon. Then, a specimen of the copolymer is prepared, followed by measuring elemental silicon (Si) included in the specimen by X-ray fluorescence (XRF) analysis and substituting the measured values to the calibration curve, thereby performing quantitative analysis.

TABLE 1

|  | Preparative Example 1 | Preparative Example 2 | Preparative Example 3 | Preparative Example 4 |
|---|---|---|---|---|
| Glass transition temperature (° C.) | 98.3 | 92.5 | 90.3 | 104.5 |
| Amount of insolubles (wt %) | 47.8 | 51.2 | 46.8 | 45.5 |
| Amount of silicon (mg/kg) | 6,289 | 6,066 | 6,159 | 6,162 |

Details of components used in the following Examples and Comparative Examples are as follows.

(A) Graft Copolymer

A diene rubber-modified graft copolymer (g-ABS, average (z-average) particle size of rubber: 320 nm) prepared by grafting 42 parts by weight of a monomer mixture including 75 wt % of styrene and 25 wt % of acrylonitrile to 58 parts by weight of a butadiene rubber is used.

(B) Aromatic Vinyl Copolymer

An aromatic vinyl copolymer (SAN), which was prepared by suspension polymerization of a monomer mixture including 76 wt % of styrene and 26 wt % of acrylonitrile and had having a weight average molecular weight 120,000 g/mol, is used.

(C) Aromatic Vinyl Copolymer (C1) The aromatic vinyl copolymer of Preparative Example 1 is used.

(C2) The aromatic vinyl copolymer of Preparative Example 2 is used.

(C3) The aromatic vinyl copolymer of Preparative Example 3 is used.

(C4) The aromatic vinyl copolymer of Preparative Example 4 is used.

Examples 1 to 3 and Comparative Example 1

According to compositions and amounts as listed in Table 2, the components are mixed for 10 minutes using a tumbler mixer and then introduced into a 44 L/D twin-screw type extruder having a diameter of 45 mm, followed by melting and extrusion at a barrel temperature of 250° C. and stirring rate of 250 rpm, thereby preparing pellets. The prepared pellets are dried at 80° C. for 2 hours or more, followed by injection molding using an injection molding machine (LGH-140N, LG Co., Ltd.) at a cylinder temperature of 230° C., thereby preparing a specimen. The prepared specimen is evaluated as to the following properties. Results are shown in Table 2.

Property Evaluation (1) Gloss (surface gloss) (unit: %): Gloss is measured at an angle of 60° in accordance with ASTM D523 using a BYK-Gardner gloss meter (BYK Co., Ltd.).

(4) Izod impact strength (unit: kgf·cm/cm): Izod impact strength is measured on ⅛" thick notched specimens in accordance with ASTM D256.

(5) Melt-flow index (MI, unit: g/10 min).

Melt-flow index is measured under conditions of 220° C./10 kgf in accordance with ASTM D1238.

TABLE 2

|  | Example | | | Comparative Example |
|---|---|---|---|---|
|  | 1 | 2 | 3 | 1 |
| (A) (wt %) | 20 | 20 | 20 | 20 |
| (B) (wt %) | 70 | 70 | 70 | 70 |
| (C1) (wt %) | 10 | — | — | — |
| (C2) (wt %) | — | 10 | — | — |
| (C3) (wt %) | — | — | 10 | — |
| (C4) (wt %) | — | — | — | 10 |
| Gloss | 33 | 35 | 31 | 32 |
| Izod impact strength | 12.5 | 12.7 | 13.5 | 11.8 |
| Melt-flow index | 6.2 | 7.8 | 8.5 | 5.0 |

From the results of Table 2, it can be seen that the thermoplastic resin composition including the aromatic vinyl copolymer according to the invention exhibits excellent impact strength, matting properties (gloss), and flowability (moldability).

Conversely, it can be seen that the thermoplastic resin composition of Comparative Example 1 exhibits low flowability (melt-flow index) and thus is not suitable for injection molding.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. An aromatic vinyl copolymer prepared by copolymerization of a reaction mixture comprising:
an aromatic vinyl compound;
a vinyl cyanide compound;
a silicone compound having at least two unsaturated reactive groups; and
a $C_4$ to $C_{20}$ linear or branched alkyl group-containing acrylic compound,
wherein the silicone compound comprises at least one of a first silicone compound having a weight average molecular weight of about 150 g/mol to less than 6,000 g/mol as represented by Formula 1 and a second silicone compound having a weight average molecular weight of about 6,000 g/mol to about 100,000 g/mol as represented by Formula 2a:

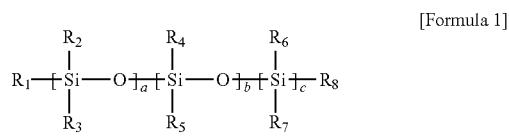

[Formula 1]

wherein a, b and c are the same or different and are each independently an integer of 0 to 79, provided that a, b and c are not 0 at the same time and a+b+c ranges from 1 to 79; $R_1$ to $R_8$ are the same or different and are each independently a hydrogen atom, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a (meth)acrylate group, a hydroxyl group, an alkoxy group, an amino group, an epoxy group, a carboxyl group, a halogen group, an ester group, an isocyanate group, or a mercapto group; with the proviso that at least two of $R_1$ to $R_8$ include polymerizable unsaturated reactive groups; wherein the compound has a linear structure or a cyclic structure in which $R_1$ to $R_8$ are linked to one another or form a single bond;

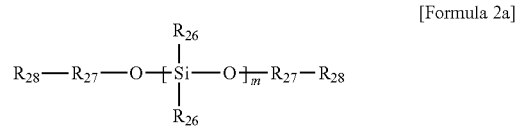

[Formula 2a]

wherein each $R_{26}$ is independently a hydrogen atom or a $C_1$ to $C_{10}$ alkyl group; each $R_{27}$ is independently a single bond or a $C_1$ to $C_{10}$ alkenyl group; each $R_{28}$ is a (meth)acrylate group; and m is an integer from 80 to 1,500.

2. The aromatic vinyl copolymer according to claim 1, wherein the reaction mixture comprises about 0.1 parts by weight to about 20 parts by weight of the silicone compound and about 1 part by weight to about 20 parts by weight of the acrylic compound, each based on about 100 parts by weight of a monomer mixture comprising about 60 wt % to about 80 wt % of the aromatic vinyl compound and about 20 wt % to about 40 wt % of the vinyl cyanide compound.

3. The aromatic vinyl copolymer according to claim 1, wherein the compound represented by Formula 1 comprises a compound represented by Formula 3:

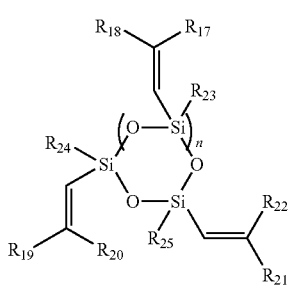

[Formula 3]

wherein $R_{17}$ to $R_{22}$ are the same or different and are each independently a hydrogen atom, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{23}$ to $R_{25}$ are the same or different and are each independently a hydrogen atom or a substituted or unsubstituted $C_1$ to $C_6$ alkyl group; and n is an integer of 1 to 6.

4. The aromatic vinyl copolymer according to claim 1, wherein the first silicone compound has a weight average molecular weight of about 150 g/mol to about 3,000 g/mol, and the second silicone compound has a weight average molecular weight of about 6,500 g/mol to about 30,000 g/mol.

5. The aromatic vinyl copolymer according to claim 1, wherein a difference in weight average molecular weight between the first silicone compound and the second silicone compound ranges from about 5,000 g/mol to about 20,000 g/mol.

6. The aromatic vinyl copolymer according to claim 1, wherein the aromatic vinyl copolymer comprises about 5 wt % to 100 wt % of insolubles remaining after Soxhlet extraction for 48 hours using tetrahydrofuran (THF), and about 0.03 wt % to about 3.26 wt % of silicon measured by X-ray fluorescence (XRF) analysis, based on the total weight of the copolymer.

7. The aromatic vinyl copolymer according to claim 1, wherein the aromatic vinyl copolymer has a glass transition temperature of about 90° C. to about 120° C.

8. A thermoplastic resin composition comprising the aromatic vinyl copolymer according to claim 1, wherein the thermoplastic resin composition has a gloss of about 20% to about 60% as measured at an angle of about 60° in accordance with ASTM D523; an Izod impact strength of about 5 kgf·cm/cm to about 15 kgf·cm/cm as measured on an about ⅛" thick specimen in accordance with ASTM D256; and a melt index (MI) of about 5.5 g/10 min to about 20 g/10 min as measured under conditions of about 200° C./10 kg in accordance with ISO 1133.

9. The thermoplastic resin composition according to claim 8, comprising the aromatic vinyl copolymer in an amount of about 1 wt % to about 50 wt % based on the total weight of the thermoplastic resin composition.

10. The thermoplastic resin composition according to claim 8, comprising: a thermoplastic resin comprising at least one of a rubber-modified aromatic vinyl copolymer, a polycarbonate resin, and a poly(meth)acrylate resin.

11. A molded article formed of the thermoplastic resin composition according to claim 8.

12. The aromatic vinyl copolymer according to claim 4, wherein the first silicone compound has a weight average molecular weight of about 150 g/mol to about 1,000 g/mol, and the second silicone compound has a weight average molecular weight of about 7,000 g/mol to about 20,000 g/mol.

13. The aromatic vinyl copolymer according to claim 1, wherein the second silicone compound comprises methacrylated polydimethylsiloxane (MPDMS), wherein in Formula 2a, $R_{26}$ is a methyl group, $R_{27}$ is a propylene group, and $R_{28}$ is a (meth)acrylate group.

14. The aromatic vinyl copolymer according to claim 1, wherein the first silicone compound comprises a compound represented by Formula 3:

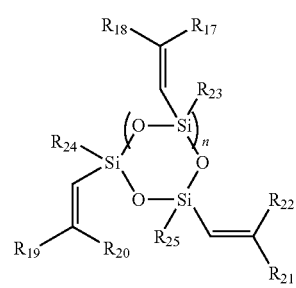

[Formula 3]

wherein $R_{17}$ to $R_{22}$ are the same or different and are each independently a hydrogen atom, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{23}$ to $R_{25}$ are the same or different and are each independently a hydrogen atom or a substituted or unsubstituted $C_1$ to $C_6$ alkyl group; and n is an integer of 1 to 6; and wherein the first silicone compound has a weight average molecular weight of about 150 g/mol to about 3,000 g/mol, and the second silicone compound has a weight average molecular weight of about 6,500 g/mol to about 30,000 g/mol.

15. The aromatic vinyl copolymer according to claim 14, wherein the first silicone compound has a weight average molecular weight of about 150 g/mol to about 1,000 g/mol, and the second silicone compound has a weight average molecular weight of about 7,000 g/mol to about 20,000 g/mol.

* * * * *